(12) United States Patent
Koga

(10) Patent No.: US 9,772,681 B2
(45) Date of Patent: Sep. 26, 2017

(54) RECORDING AND PLAYBACK APPARATUS AND RECORDING AND PLAYBACK METHOD

(71) Applicant: Sony Corporation, Tokyo (JP)

(72) Inventor: Yasuyuki Koga, Kanagawa (JP)

(73) Assignee: Sony Corporation, Tokyo (JP)

( * ) Notice: Subject to any disclaimer, the term of this patent is extended or adjusted under 35 U.S.C. 154(b) by 301 days.

(21) Appl. No.: 13/681,646

(22) Filed: Nov. 20, 2012

(65) Prior Publication Data
US 2013/0139059 A1 May 30, 2013

(30) Foreign Application Priority Data
Nov. 30, 2011 (JP) .................. 2011-261519

(51) Int. Cl.
- G06F 3/01 (2006.01)
- G06F 3/16 (2006.01)
- G11B 20/10 (2006.01)
- G11B 27/10 (2006.01)

(52) U.S. Cl.
CPC .............. G06F 3/01 (2013.01); G06F 3/165 (2013.01); G11B 20/10527 (2013.01); G11B 27/102 (2013.01); G11B 2020/10944 (2013.01); G11B 2020/10962 (2013.01)

(58) Field of Classification Search
CPC .. G06F 17/3074; G06F 3/16; G06F 17/30787; G06F 3/048; G06F 3/01; G06F 3/165; G10L 19/167; G10L 25/54; H04H 60/58; H04H 60/46; H04H 60/64; H04H 60/73; G11B 20/10527; G11B 27/10; G11B 20/10; G11B 27/034; G11B 27/28; G11B 27/36; G11B 27/102; G11B 2020/10944; G11B 2020/10962

See application file for complete search history.

(56) References Cited

U.S. PATENT DOCUMENTS

| | | | |
|---|---|---|---|
| 4,375,101 A * | 2/1983 | Cerracchio | 386/208 |
| 2002/0094191 A1* | 7/2002 | Horie et al. | 386/46 |
| 2003/0063004 A1* | 4/2003 | Anthony et al. | 340/574 |
| 2004/0114475 A1* | 6/2004 | Suzuki et al. | 369/30.08 |
| 2005/0096764 A1* | 5/2005 | Weiser | 700/94 |
| 2006/0047624 A1* | 3/2006 | Ando et al. | 707/1 |
| 2008/0107244 A1* | 5/2008 | Setzer et al. | 379/88.12 |
| 2009/0012880 A1* | 1/2009 | Tortola | 705/27 |
| 2009/0244378 A1* | 10/2009 | Chen | H04N 5/45 348/565 |

* cited by examiner

Primary Examiner — Jeffrey A Gaffin
Assistant Examiner — Mandrita Brahmachari
(74) Attorney, Agent, or Firm — Chip Law Group

(57) ABSTRACT

There is provided an information processing apparatus including a recording section recording data continuously acquired via a sensor; and a controlling section controlling a playback of record data recorded by the recording section, wherein, in response to a user input, the controlling section performs control such that the record data is played from a timing predated with reference to a timing of the user input.

16 Claims, 13 Drawing Sheets

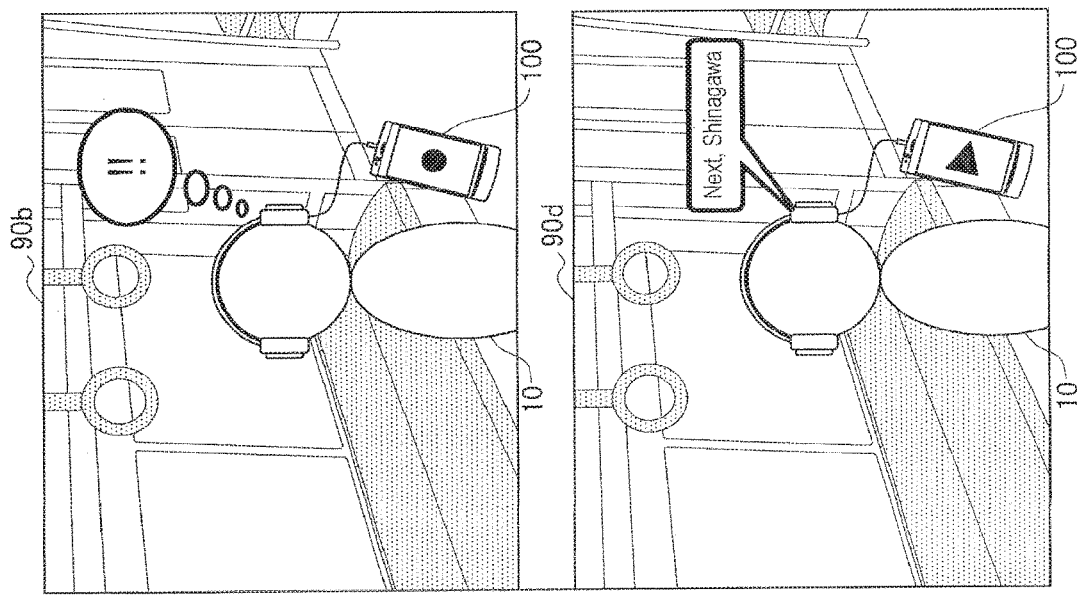
FIG. 2
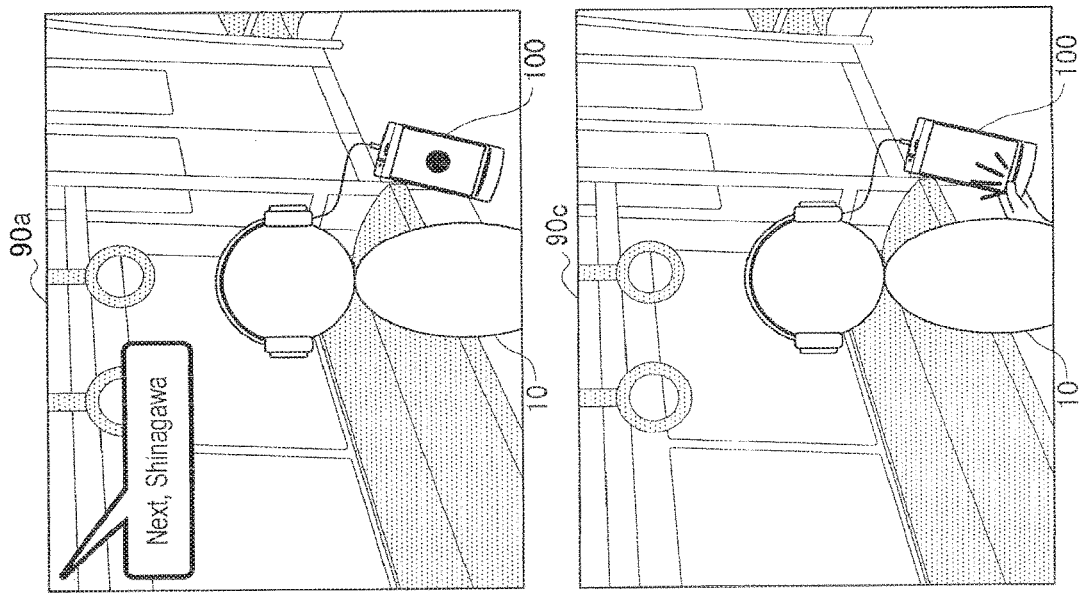

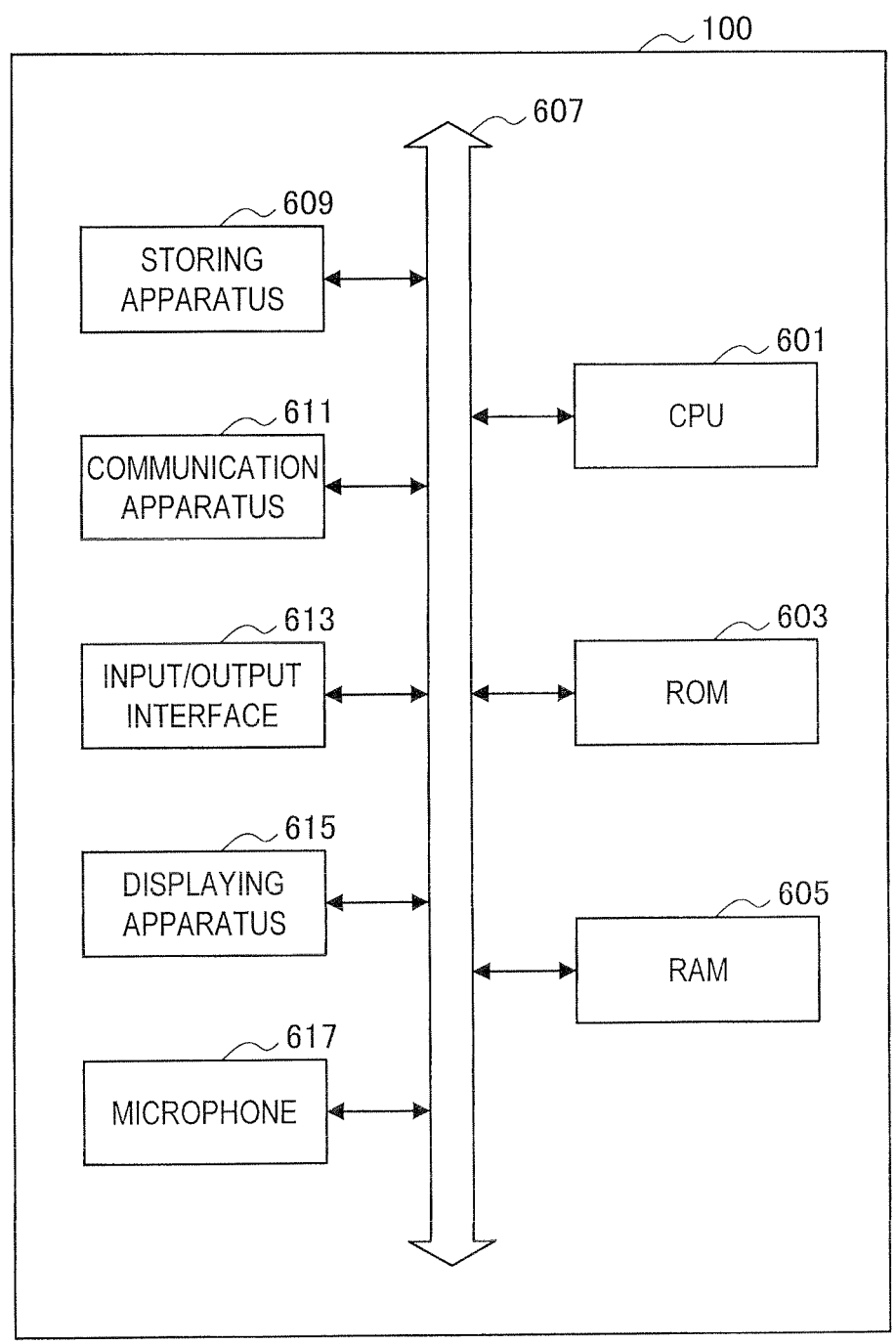

RECORDING AND PLAYBACK APPARATUS AND RECORDING AND PLAYBACK METHOD

BACKGROUND

The present disclosure relates to an information processing apparatus, a program and an information processing method.

In recent years, information such as sound and image is one-sidedly provided in various situations. Typically, for example, sound and image are provided by radio broadcast or television broadcast.

Even if the information such as sound and image is provided, it may fail to be heard or watched. Also, even if the information is requested to be checked as a result of failure to be heard or watched, in many cases, it is difficult to check it because the information is not provided again. Therefore, especially regarding a broadcast program, there is a technique for checking a missed image again.

For example, Japanese Patent Laid-Open No. 2005-109529 discloses a program record technique of, when a broadcast program channel is changed and subsequently returned to the previous channel again, enabling the broadcast program to be watched from the latest playback which is before changing channel.

SUMMARY

However, in the technique of Japanese Patent Laid-Open No. 2005-109529, in a case where it is possible to directly acquire information data such as sound and image to be provided like a broadcast program, although it is possible to check the information again, it is difficult to recheck information such as sound and image that are one-sidedly provided in various situations in an unexpected manner. For example, it is difficult to recheck information such as sound and image provided by a train announcement, an announcement in a shopping center, a barker from a shop, an advertisement, and so on.

Therefore, the present disclosure suggests a new and improved information processing apparatus, program and information processing method that enable information such as sound and image one-sidedly provided in an unexpected manner to be checked.

According to an embodiment of the present disclosure, there is provided an information processing apparatus which includes: a recording section recording data continuously acquired via a sensor; and a controlling section controlling a playback of record data recorded by the recording section, in which, in response to a user input, the controlling section performs control such that the record data is played from a timing predated with reference to a timing of the user input.

According to another embodiment of the present disclosure, there is provided a program which causes a computer to function as: a recording section recording data continuously acquired via a sensor; and a controlling section controlling a playback of record data recorded by the recording section, in which, in response to a user input, the controlling section performs control such that the record data is played from a timing predated with reference to a timing of the user input.

According to another embodiment of the present disclosure, there is provided an information processing method which includes: recording data continuously acquired via a sensor; and controlling a playback of record data recorded, in which, in response to a user input, the controlling includes controlling to play the record data from a timing predated with reference to a timing of the user input.

As described above, according to the information processing apparatus, program and information processing method based on the embodiments of the present disclosure, it is possible to check information such as sound and image one-sidedly provided in an unexpected manner.

BRIEF DESCRIPTION OF THE DRAWINGS

FIG. 2 is an explanation diagram for explaining an example of a usage scene of a user apparatus according to the first embodiment;

FIG. 13 is a block diagram illustrating an example of a hardware configuration of a user apparatus according to an embodiment of the present disclosure.

DETAILED DESCRIPTION OF THE EMBODIMENT(S)

Figure 1:
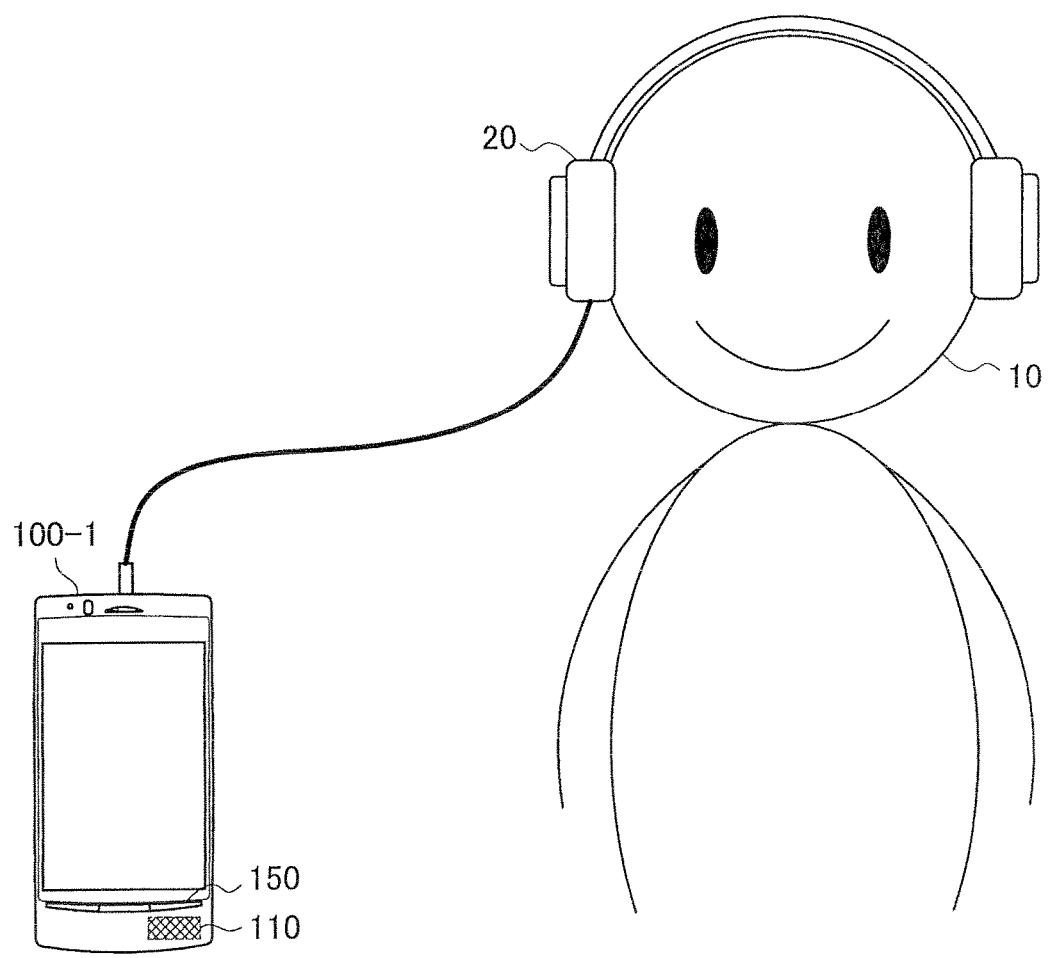
FIG. 1 is an appearance view illustrating an example of an appearance of a user apparatus according to the first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, an explanation will be given in the following order.
1. First embodiment
1.1. Outline
1.2. Configuration of user apparatus
1.3. Flow of processing
1.4. Variation example 2. Second embodiment
2.1. Outline
2.2. Configuration of user apparatus
2.3. Flow of processing
3. Third embodiment
3.1. Outline
3.2. Configuration of server apparatus
3.3. Flow of processing
4. Configuration of hardware
5. Conclusion

1. FIRST EMBODIMENT

[1.1 Outline]

First, with reference to FIG. 1 and FIG. 2, an outline of the first embodiment of the present disclosure will be explained. According to the first embodiment, by a user apparatus, a user can check sound that is one-sidedly provided in an unexpected manner. That is, in the first embodiment, the user apparatus is an example of an information processing apparatus.

With reference to FIG. 1, an appearance of a user apparatus 100-1 according to the first embodiment will be explained. FIG. 1 is an appearance view illustrating an example of the appearance of the user apparatus 100-1 according to the first embodiment. Referring to FIG. 1, it illustrates the user apparatus 100-1, a user 10 of the user apparatus 100-1 and headphones 20 which are connected to the user apparatus 100-1 and used by the user 10.

The user apparatus 100-1 has a sound collector 110 and collects ambient sound by the sound collector 110. Also, by playing back sound data, the user apparatus 100-1 provides sound to the user 10 via the headphones 20. Also, the user apparatus 100-1 has an operating section 150 and, in response to a user input by the user 10 to the operating section 150, performs an operation corresponding to the input.

The user apparatus 100-1 is a smartphone, for example. Here, the user apparatus 100-1 is not limited to a smartphone but may be another user apparatus carried by the user 10, such as a mobile telephone terminal different from the smartphone, a music player, a personal digital assistance (PDA), an electronic book reader and a digital camera.

As described above, according to the first embodiment, by the user apparatus 100-1, the user 10 can check sound that is one-sidedly provided in an unexpected manner. This point will be explained below in detail with reference to FIG. 2.

FIG. 2 is an explanation diagram for explaining an example of a usage scene of the user apparatus 100-1 according to the first embodiment. Referring to FIG. 2, first, in a scene 90a, the user 10 listens to sound (e.g. music) played by the user apparatus 100-1 via the headphones 20 in a train. At that time, sound to announce the next station is provided as a train announcement. Next, in a scene 90b, the user 10 finds that he/she failed to hear the sound to announce the next station. Here, it is assumed that the user 10 wants to check which station the next station is. Subsequently, in a scene 90c, the user 10 performs a user input to the operating section 150 to check the sound which failed to be heard. As a result, in a scene 90d, the user apparatus 100-1 provides the user 10 with the sound provided as a train announcement, and the user 10 can know the next station.

In [1.2. Configuration of user apparatus], [1.3. Flow of processing] and [1.4. Variation example], specific content of the first embodiment will be explained below.

[1.2. Configuration of User Apparatus]

Figure 3:
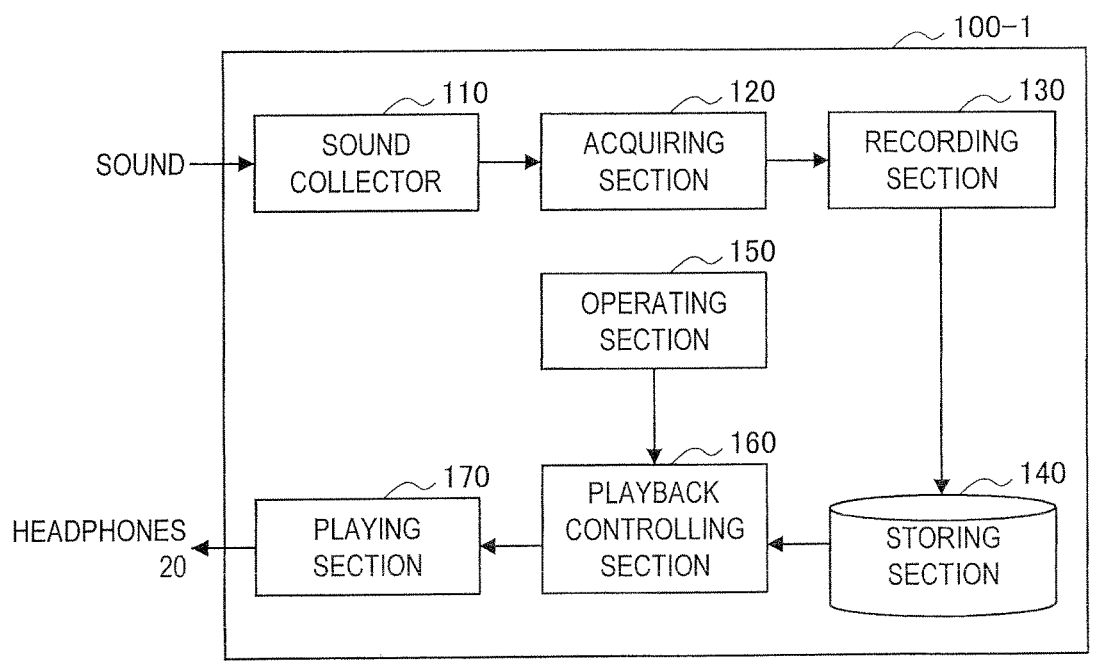
FIG. 3 is a block diagram illustrating an example of a configuration of a user apparatus according to the first embodiment.

With reference to FIG. 3, an example of the configuration of the user apparatus 100-1 according to the first embodiment will be explained. FIG. 3 is a block diagram illustrating an example of a configuration of the user apparatus 100-1 according to the first embodiment. Referring to FIG. 3, the user apparatus 100-1 has the sound collector 110, an acquiring section 120, a recording section 130, a storing section 140, the operating section 150, a playback controlling section 160 and a playing section 170. Here, the sound collector 110 is an example of a sensor and the playback controlling section 160 is an example of a controlling section.

(Sound Collector 110)

The sound collector 110 continuously collects ambient sound of the user apparatus 100-1. For example, the sound collector 110 converts the continuously-collected sound into an electric signal and outputs this electric signal to the acquiring section 120.

(Acquiring Section 120)

The acquiring section 120 continuously acquires sound data via the sound collector 110. For example, the acquiring section 120 continuously acquires sound data by performing analog-to-digital conversion on the electric signal from the sound collector 110. Subsequently, the acquiring section 120 outputs the sound data to the recording section 130.

(Recording Section 130)

The recording section 130 records the sound data continuously acquired via the sound collector 110. For example, by causing the storing section 140 to store the sound data from the acquiring section 120, the recording section 130 records the sound data. Thus, by recording the sound data continuously acquired in the user apparatus 100-1 carried by the user 10, even if sound is one-sidedly provided in an unexpected manner, it is possible to record the sound.

Also, the recording section 130 causes a buffer having a predetermined capacity to continuously store sound data, and, after sound data of a predetermined capacity (or predetermined time period) is stored, overwrite older data and store new sound data. Thus, by overwriting older data, it is possible to continuously record data in a limited storage capacity.

Also, for example, the recording section 130 records all sound data continuously acquired.

(Storing Section 140)

The storing section 140 stores information to be temporarily or permanently held in the user apparatus 100-1. Especially, the storing section 140 stores the sound data continuously acquired via the sound collector 110. For example, the storing section 140 includes a buffer of a predetermined capacity to store the sound data, and causes the buffer to store the sound data.

(Operating Section 150)

The operating section 150 accepts a user input by the user 10. For example, in response to a user input to play record sound data recorded by the recording section 130, the operating section 150 reports to the playback controlling section 160 that the user input was made. Also, in response to a user input to stop the playback of the record sound data, the operating section 150 reports to the playback controlling section 160 that the user input was made.

(Playback Controlling Section 160)

The playback controlling section 160 controls the playback of record sound data recorded by the recording section 130. Here, in response to a user input, the playback controlling section 160 controls the record sound data to be played from the timing predated with reference to the timing of the user input. For example, when receiving a report from the operating section 150 that a user input to play record sound data was made, the playback controlling section 160 acquires the record sound data from the storing section 140 and outputs it to the playing section 170. Subsequently, the playback controlling section 160 instructs the playing section 170 that the timing predated with reference to the timing of the user input is the playback start timing. Thus, by playing the record sound data from the timing predated with reference to the timing of the user input, even if the user 10 fails to hear sound one-sidedly provided in an unexpected manner, it is possible to hear and check the sound soon if the check is requested.

For example, the timing predated with reference to the timing of the user input is the timing predated by a predetermined time period from the timing of the user input. For example, the playback controlling section 160 performs control such that the record sound data is played from the timing predated by 10 seconds from the timing of the user input. Thus, if it is possible to determine a predetermined time period based on an estimation time period taken to make a user input after the sound is provided and the user 10 finds that he/she failed to hear that, the user 10 can hear the sound from the timing predated by the sufficient time period.

Also, for example, when receiving a report from the operating section 150 that a user input to stop the playback of the record sound data was made, the playback controlling section 160 instructs the playing section 170 to stop the playback.

(Playing Section 170)

The playing section 170 plays sound data. Especially, in response to the playback control by the playback controlling section 160, the playing section 170 plays the record sound data recorded by the recording section 130. For example, the playing section 170 plays the record sound data from the playback controlling section 160, from the playback start timing reported from the playback controlling section 160. In the playback, for example, the playing section 170 performs digital-to-analog conversion on the sound data and outputs an electric signal to the headphones 20, Also, the playing section 170 stops the playback according to the playback stop control by the playback controlling section 160.

[1.3 Flow of Processing]

Figure 4:
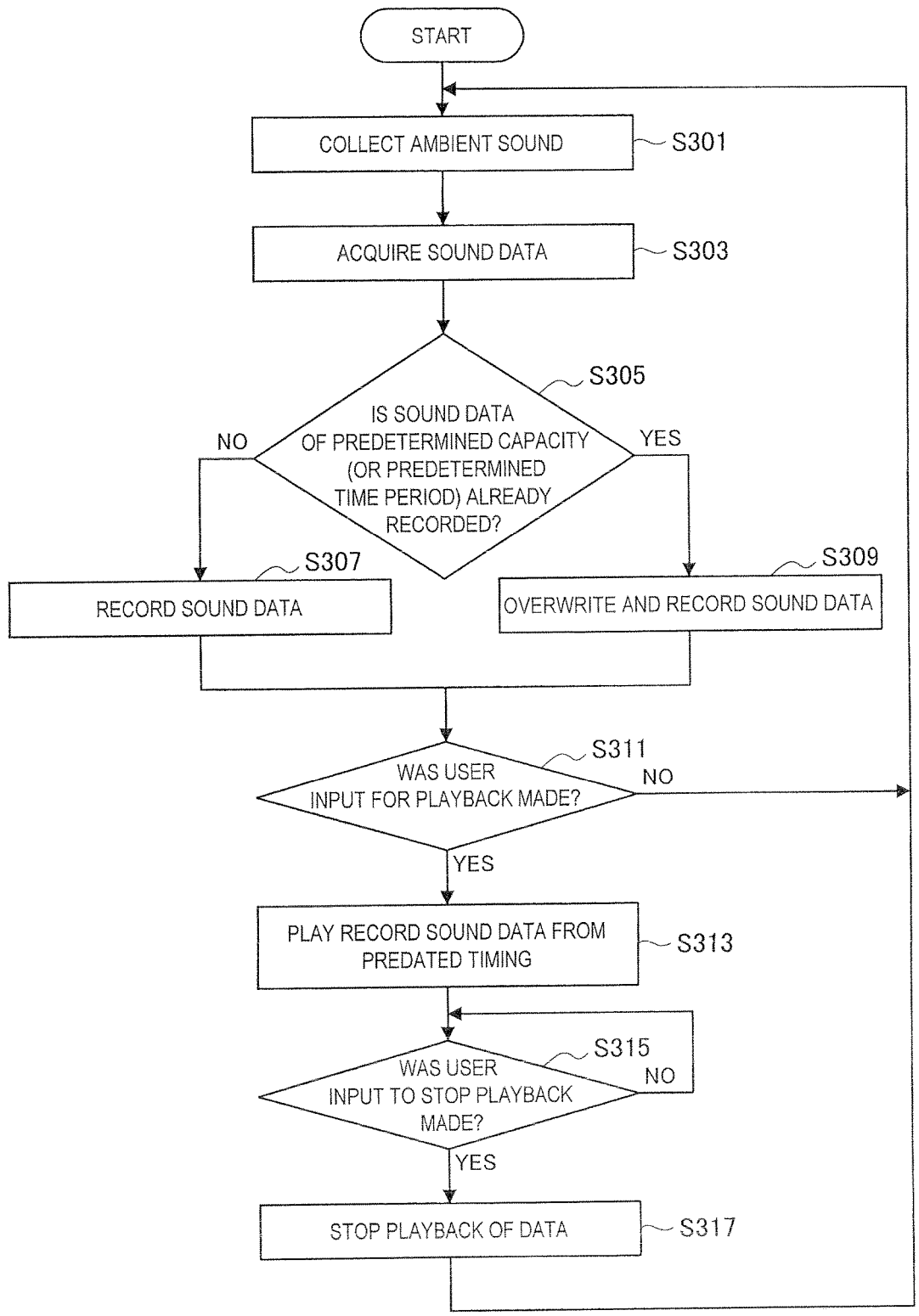
FIG. 4 is a flowchart illustrating an example of a schematic flow of information processing according to the first embodiment.

Next, with reference to FIG. 4, an example of information processing according to the first embodiment will be explained. FIG. 4 is a flowchart illustrating an example of a schematic flow of the information processing according to the first embodiment.

First, in step S301, the sound collector 110 continuously collects ambient sound of the user apparatus 100-1. Next, in step S303, the acquiring section 120 continuously acquires sound data via the sound collector 110.

Subsequently, in step S305, the recording section 130 decides whether sound data of a predetermined capacity (or predetermined time period) is already recorded. In a case where the sound data of the predetermined capacity is already recorded, the processing proceeds to step S309. Otherwise, the processing proceeds to step S307.

In step S307, the recording section 130 records the sound data continuously acquired via the sound collector 110. Meanwhile, in step S309, the recording section 130 overwrites older data and records new sound data.

In step S311, the playback controlling section 160 decides whether a user input to play record sound data was made. In a case where the user input was made, the processing proceeds to step S313. Otherwise, the processing returns to step S301.

In step S313, the playback controlling section 160 controls a playback of the record sound data recorded by the recording section 130. Here, in response to the user input, the playback controlling section 160 performs control such that the record sound data is played from the timing predated with reference to the timing of the user input. That is, the playing section 170 plays the record sound data according to the playback control by the playback controlling section 160.

In step S315, the playback controlling section 160 decides whether a user input to stop the playback was made. In a case where the user input was made, the processing proceeds to step S317. Otherwise, the processing repeats step S315.

In step S317, the playback controlling section 160 instructs the playing section 170 to stop the playback. Subsequently, the playing section 170 stops the playback according to the playback control by the playback controlling section 160.

[1.4. Variation Example]

Although an example of the first embodiment has been described above, the first embodiment is not limited to this.

Variation Example 1

First, record sound data may include a plurality of parts (hereinafter referred to as "chapters") divided on the time axis. Also, the timing predated with reference to the timing of a user input may be the start timing of one of the multiple chapters, instead of the timing predated by a predetermined time period from the timing of the user input. That is, the playback controlling section 160 may perform control such that the record sound data is played from the start timing of one of the multiple chapters. This point will be explained in detail with reference to FIG. 5.

Figure 5:
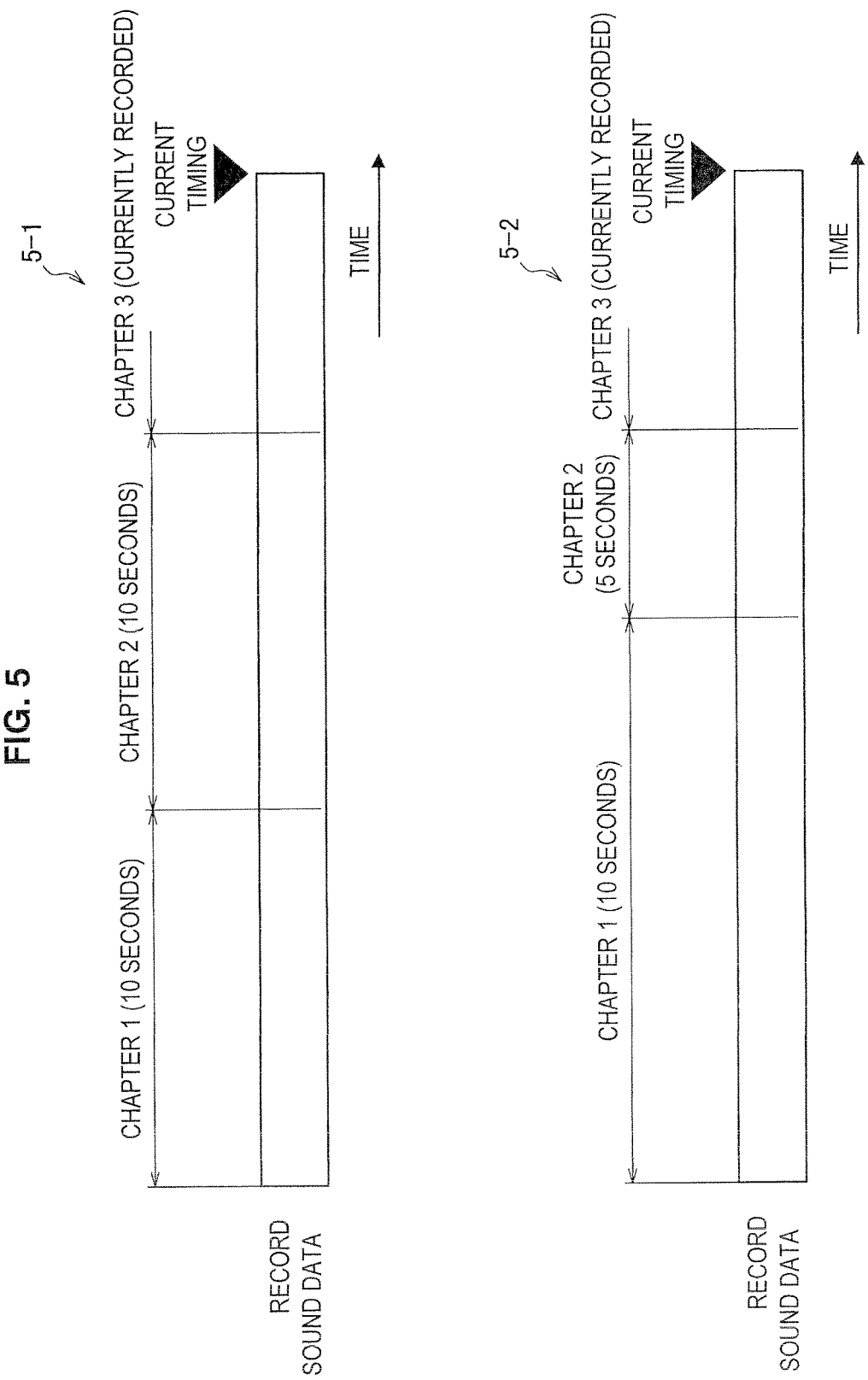
FIG. 5 is an explanation diagram for explaining an example of record sound data including a plurality of chapters divided on the time axis.

FIG. 5 is an explanation diagram for explaining an example of record sound data including a plurality of chapters divided on the time axis. Referring to FIG. 5, as illustrated in 5-1, for example, the record sound data includes a plurality of chapters divided at predetermined time intervals. In this example, the predetermined time interval is 10 seconds. Thus, by dividing it by the predetermined time period, it is possible to hear sound from the time adequately predated from the timing of a user input, without complicated processing.

Also, as illustrated in 5-2, the record data may include a plurality of chapters divided based on the data content. For example, the record data may include a plurality of chapters divided based on the loudness or frequency of sound included in the sound data. By dividing the record sound data based on the sound loudness, for example, it is possible to divide the chapters at the timings the provided sound is interrupted, or divide them into nonvoice chapters (e.g. chapters 1 and 3) and voice chapters (e.g. chapter 2). Therefore, it is possible to play the record sound data from the timing (e.g. the start timing of chapter 2) predated to immediately before the most-recently provided sound since a user input, and check the most-recently provided sound. Also, for example, by dividing the record sound data based on the sound frequency, for example, it is possible to divide the record sound data at the timing a speaker of the provided sound changes. Therefore, it is possible to play the record sound data from the timing predated to immediately before the start of sound of the latest previous speaker, and check the sound of the speaker. As described above, by dividing the record sound data into chapters based on the data content, it is possible to rehear sound from the timing predated to immediately before the most-recently provided sound.

The timing predated from the user input may be the start timing of the latest previous chapter to the user input among the multiple chapters divided on the time axis. By going back to the latest previous chapter, it is possible to quickly check the latest previous sound.

Also, when acquiring sound data, the acquiring section 120 may divide the sound data into chapters. Alternatively, before recording sound data or after recording sound data, the recording section 130 may divide the sound data into chapters. Here, for example, the record sound data is divided into chapters by data division or by assigned information indicating the timings of dividing the chapters.

Variation Example 2

Second, the timing predated with reference to the timing of a user input may be the timing determined based on data content, instead of the timing predated by a predetermined time period from the timing of the user input. In this case, the predated timing is, for example, the timing determined based on a detection result of keyword sound in the sound data. This point will be explained in detail with reference to FIG. 6.

Figure 6:
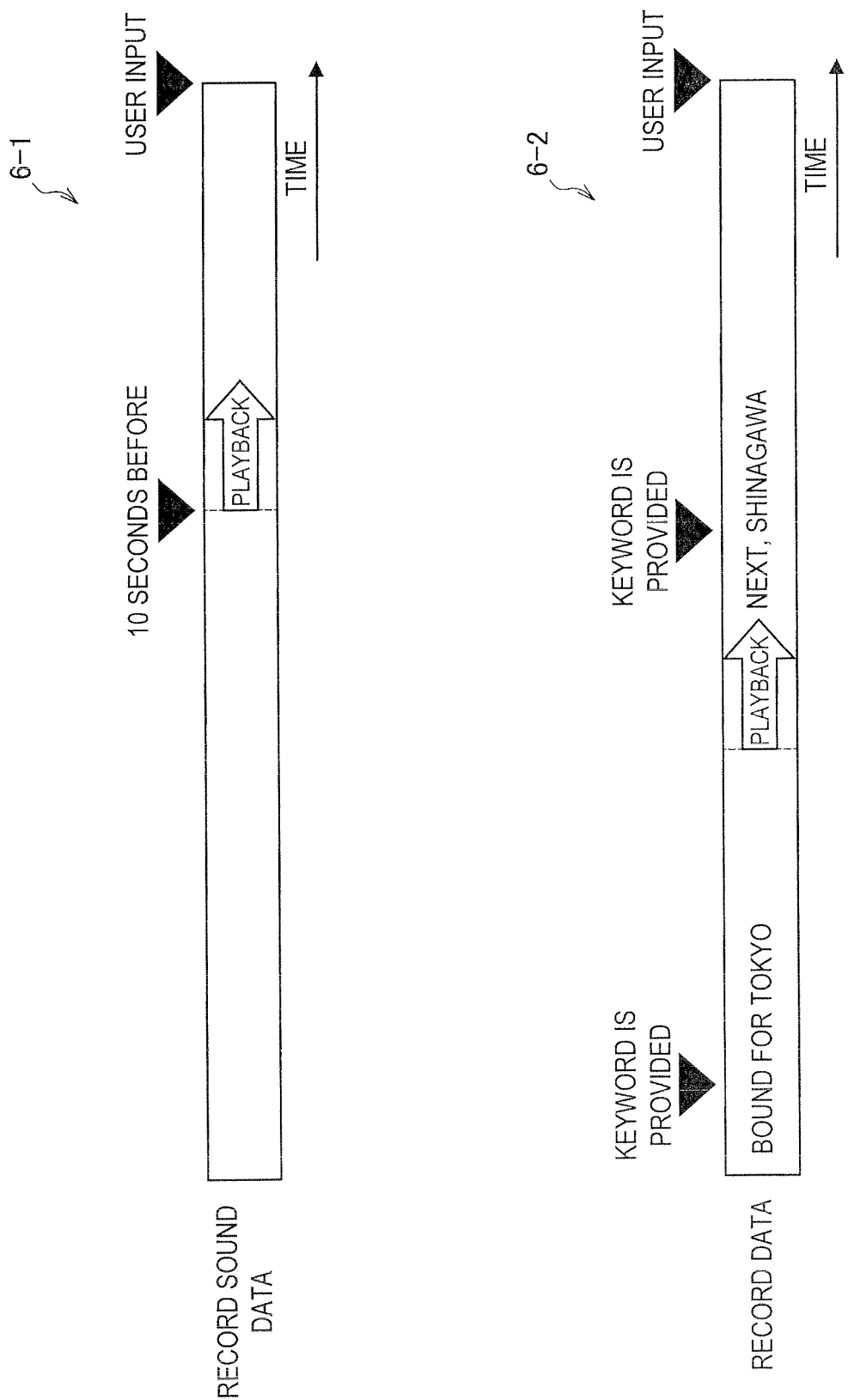
FIG. 6 is an explanation diagram for explaining an example at the timing of a playback of record sound data.

FIG. 6 is an explanation diagram for explaining an example at the timing of a playback of record sound data. Referring to FIG. 6, as illustrated in 6-1, according to the example of the first embodiment described above, record sound data is played from the timing predated by a predetermined time period (e.g. 10 seconds before a user input) from the timing of the user input. Meanwhile, as illustrated in 6-2, keyword (e.g. station name) sound in sound data may be detected and, based on the detection result, record sound data may be played from, for example, the timing slightly before the latest previous keyword. Thus, by using the detection result of keyword sound, it is possible to perform a playback from the timing before desired information is provided, and thereby rehear the desired information.

Also, the predated timing may be the timing determined based on the loudness or frequency of sound included in the sound data, instead of the timing determined based on the keyword detection result. Therefore, it is possible to acquire the same effect as in a case where the record sound data is divided into a plurality of chapters based on the loudness or frequency of sound.

Variation Example 3

Third, for example, instead of recording all of continuously-acquired sound data, the recording section 130 may record part of the sound data. Here, for example, the recorded sound data may be determined based on the loudness or frequency of sound in the sound data. As an example, in the continuously-acquired sound data, a part including sound of loudness over a predetermined threshold is recorded. Also, as another example, in the acquired sound data, a part including sound of a specific frequency band is recorded. By such selective storage, it is possible to record only effective data. As a result, in a limited storage capacity, more items of effective data are recorded.

Variation Example 4

Fourth, according to the type of a user input, the playback controlling section 160 may determine the timing predated with reference to the timing of the user input according to the type of a user input and perform control such that record sound data is played from the determined timing. As an example, in a case where a user input denotes a press of a specific button, the predated timing may be determined according to the number of times the button is consecutively pressed. For example, in 6-1 of FIG. 6, the timing predated by a time period (the number of times the button is pressed)× (10 seconds) from the timing of the user input may be determined. Therefore, by changing the user input type as requested, it is possible to rehear sound from a desired timing.

Also, by a further user input after a playback of record sound data starts, the record sound data may be played from a further predated timing. For example, in 6-1 of FIG. 6, by the first user input, the record sound data may be played from the timing predated by 10 seconds from the timing of the user input, and, by a second user input during the playback, the record sound data may be played from the timing predated by 20 seconds from the timing of the first user input. Therefore, by a further user input, the user can rehear sound from a desired timing.

Variation Example 5

Fifth, during a playback of record sound data, the recording section 130 may record continuously-acquired sound data and the playback controlling section 160 may perform control such that the record sound data may be played between the timing predated with reference to the timing of a user input and one of the timings after the timing of the user input. That is, the playback controlling section 160 may perform control so as to perform a follow-up playback to play recorded data in order. Therefore, the user can play sound data from the beginning while sound is being provided, and hear the sound from beginning to end.

(Others)

Also, instead of outputting record sound data to the playing section 170, the playback controlling section 160 may instruct the playback start timing to the playing section 170 and the playing section 170 may acquire the record sound data from the storing section 140.

Also, in addition to a stop of a playback of record sound data according to playback control by the playback controlling section 160, the playing section 170 may automatically stop a playback of the record sound data at a given timing. As an example, the playing section 170 may play the record sound data until the timing of a user input and then stop the playback.

Also, the sound collector 110, the acquiring section 120, the storing section 140, the operating section 150 and the playing section 170 may be set in another apparatus connected to the user apparatus 100-1.

Although the first embodiment has been described above, according to the first embodiment, the user 10 of the user apparatus 100-1 can check sound one-sidedly provided in an unexpected manner.

2. SECOND EMBODIMENT

[2.1. Outline]

Next, with reference to FIG. 7, an outline of the second embodiment of the present disclosure will be explained. According to the second embodiment, by a user apparatus, a user can check an image one-sidedly provided in an unexpected manner. In other words, although it is possible to check sound in the first embodiment, it is possible to check an image in the second embodiment. Also, in the second embodiment, the user apparatus is an example of an information processing apparatus.

Figure 7:
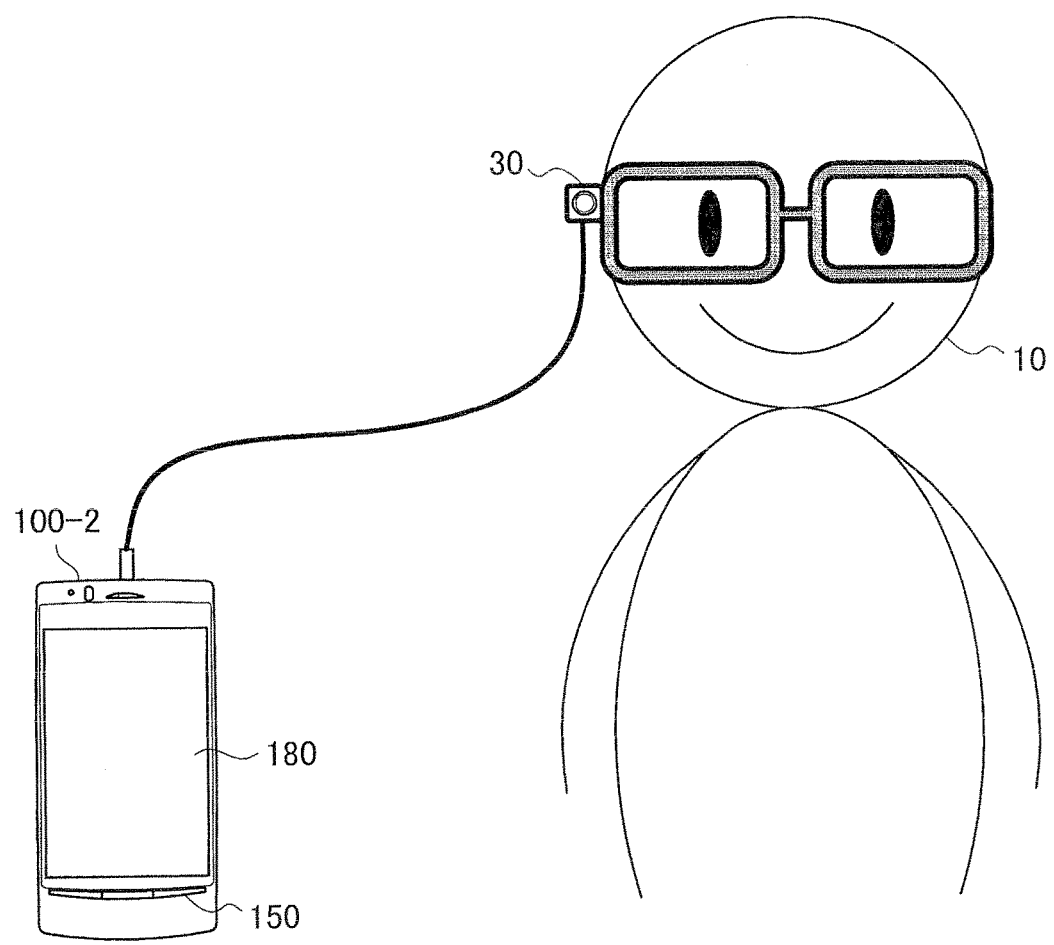
FIG. 7 is an appearance view illustrating an example of an appearance of a user apparatus according to the second embodiment.

Referring to FIG. 7, an appearance of a user apparatus 100-2 according to the second embodiment will be explained. FIG. 7 is an appearance view illustrating an example of the appearance of the user apparatus 100-2 according to the second embodiment. Referring to FIG. 7, it illustrates the user apparatus 100-2, the user 10 of the user apparatus 100-2 and an imaging apparatus 30 which is connected to the user apparatus 100-2 and attached near the eyes of the user 10. Here, an image pickup device of the imaging apparatus 30 is an example of a sensor.

The imaging apparatus 30 images a surrounding image. Also, by playing image data, the user apparatus 100-2 displays an image on a displaying section 180. Also, the user apparatus 100-2 has an operating section 150 and, in response to a user input by the user 10 to the operating section 150, performs an operation corresponding to the input.

Similar to the first embodiment, the user apparatus 100-2 is a smartphone, for example. Also, the user apparatus 100-2 may be another user apparatus carried by the user 10.

As described above, according to the second embodiment, by the user apparatus 100-2, the user 10 can check an image one-sidedly provided in an unexpected manner. In [2.2. Configuration of user apparatus] and [2.3. Flow of processing], specific content of the second embodiment will be explained below.

[2.2. Configuration of User Apparatus]

Figure 8:
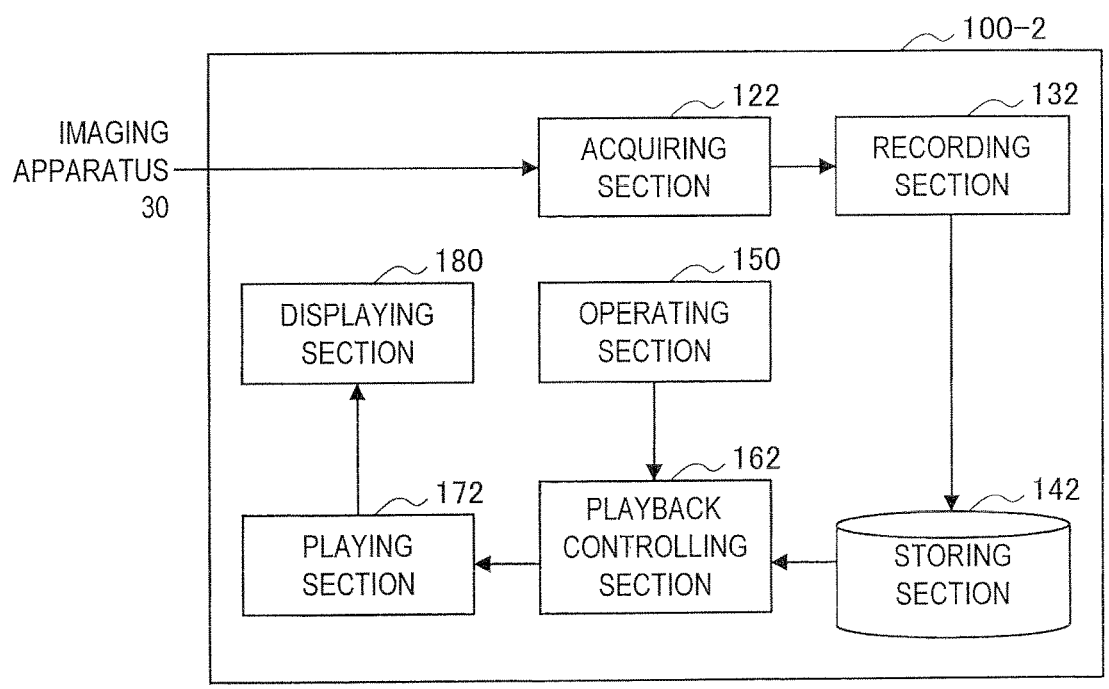
FIG. 8 is a block diagram illustrating an example of a configuration of a user apparatus according to the second embodiment.

With reference to FIG. 8, an example of the configuration of the user apparatus 100-2 according to the second embodiment will be explained. FIG. 8 is a block diagram illustrating an example of the configuration of the user apparatus 100-2 according to the second embodiment. Referring to FIG. 8, the user apparatus 100-2 has an acquiring section 122, a recording section 132, a storing section 142, the operating section 150, a playback controlling section 162, a playing section 172 and the displaying section 180. Here, the playback controlling section 162 is an example of a controlling section.

Here, the operating section 150 is the same as the operating section 150 of the first embodiment explained in [1.2. Configuration of user apparatus]. Also, the recording section 132, the storing section 142 and the playback controlling section 162 are the same as the recording section 130, the storing section 140 and the playback controlling section 160 of the first embodiment in [1.2. Configuration of user apparatus], except for a difference as to whether treated data is sound data or image data. Therefore, an explanation will be given below with respect to the acquiring section 122, the playing section 172 and the displaying section 180.

(Acquiring Section 122)

The acquiring section 122 continuously acquires image data via the imaging apparatus 30. For example, the acquiring section 122 acquires image data from the imaging apparatus 30. Subsequently, the acquiring section 120 outputs the image data to the recording section 132.

(Playing Section 172)

The playing section 172 plays image data. Especially, according to playback control by the playback controlling section 162, the playing section 172 plays record image data recorded by the recording section 132. For example, the playing section 172 plays record image data from the playback controlling section 162, from the playback start timing reported from the playback controlling section 162. In the playback, for example, the playing section 172 converts the record image data into an image signal and outputs this image signal to the displaying section 180. Also, according to the playback control by the playback controlling section 162, the playing section 172 stops the playback.

(Displaying Section 180)

The displaying section 180 displays an image. Especially, the displaying section 180 displays an image according to an image signal output from the playing section 172. That is, the displaying section 180 displays an image of record image data.

[2.3. Flow of Processing]

Figure 9:
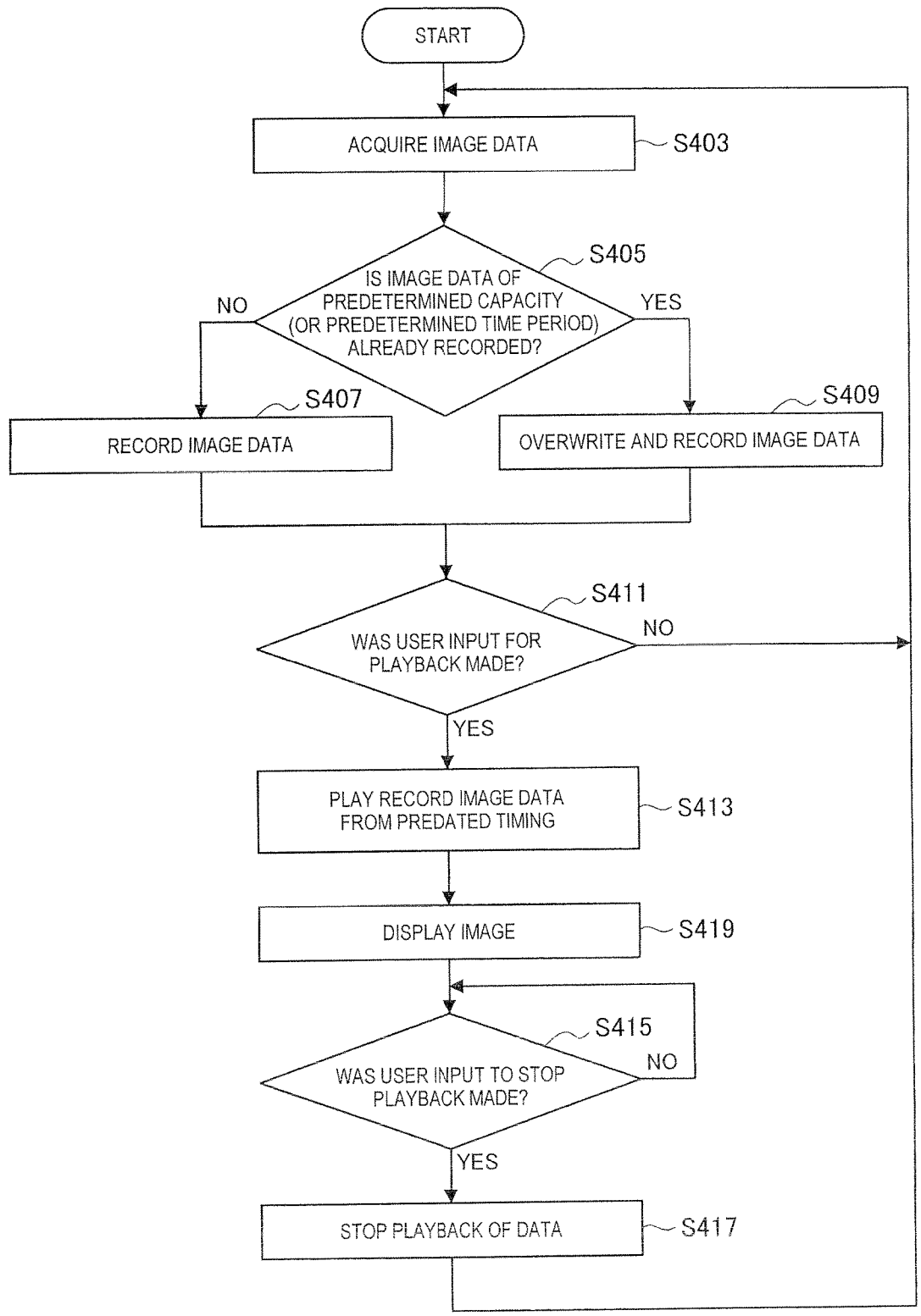
FIG. 9 is a flowchart illustrating an example of a schematic flow of information processing according to the second embodiment.

Next, referring to FIG. 9, an example of information processing according to the second embodiment will be explained. FIG. 9 is a flowchart illustrating an example of a schematic flow of the information processing according to the second embodiment.

Here, steps S403, S405, S407, S409, S411, S415 and S417 are the same as steps S303, S305, S307, S309, S311, S315 and S317 of the first embodiment in [1.3. Flow of processing], except for a difference as to whether treated data is sound data or image data. Therefore, steps S413 and S419 will be explained below.

In step S413, the playback controlling section 162 controls a playback of record image data recoded by the recording section 132. Here, in response to a user input, the playback controlling section 162 performs control such that the record image data is played from the timing predated with reference to the timing of the user input. That is, the playing section 172 plays the record image data according to the playback control by the playback controlling section 162.

Next, in step S419, the displaying section 180 displays an image according to an image signal output by the playing section 172.

Although an example of the second embodiment has been described above, the second embodiment is not limited to this. Each variation example explained in [1.4. Variation example] is similarly applicable to the second embodiment. Also, by acquiring and recording sound data in addition to image data in the second embodiment, examples of using sound data content in (Variation example 1), (Variation example 2) and (Variation example 3) are applicable to the second embodiment.

Also, the acquiring section 122, the storing section 142, the operating section 150, the playing section 172 and the displaying section 180 may be set in another apparatus connected to the user apparatus 100-2.

As described above, according to the second embodiment, the user 10 of the user apparatus 100-2 can check an image one-sidedly provided in an unexpected manner.

3. THIRD EMBODIMENT

[3.1. Outline]

Next, with reference to FIG. 10, an outline of the third embodiment of the present disclosure will be explained. According to the third embodiment, by a server apparatus, a user of a user apparatus can check sound one-sidedly provided in an unexpected manner. In other words, although it is possible to check sound by a user apparatus in the first embodiment, it is possible to check sound by a server apparatus in the third embodiment. That is, in the third embodiment, the server apparatus is an example of an information processing apparatus.

Figure 10:
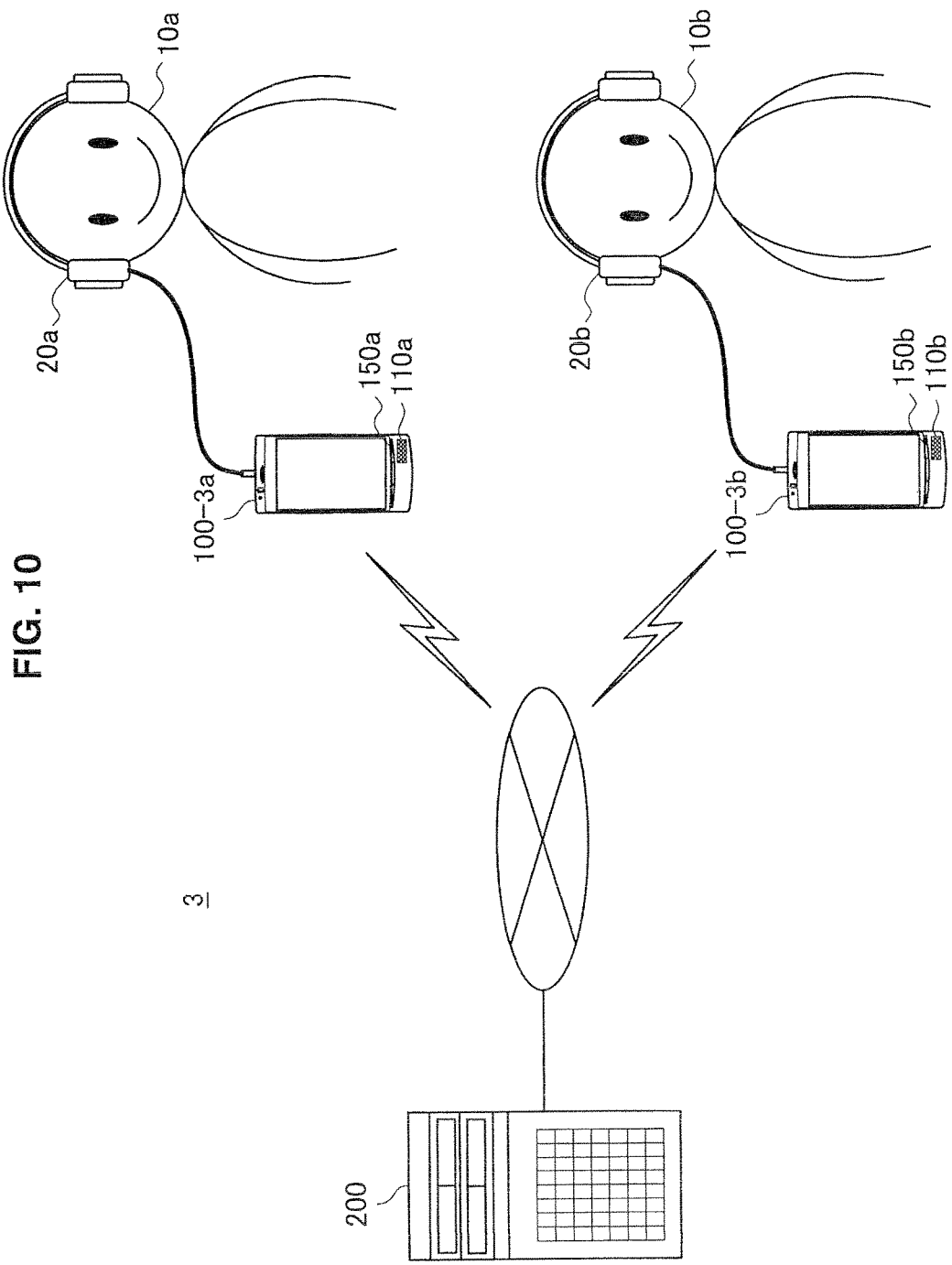
FIG. 10 is an explanation diagram illustrating an example of a schematic configuration of an information processing system according to the third embodiment.

With reference to FIG. 10, a schematic configuration of an information processing system 3 according to the third embodiment will be explained. FIG. 10 is an explanation diagram illustrating an example of a schematic configuration of the information processing system 3 according to the third embodiment. Referring to FIG. 10, the information processing system 3 includes a user apparatus 100-3 and a server apparatus 200. Also, similar to the first embodiment, FIG. 10 illustrates the user 10 and the headphones 20.

The user apparatus 100-3 has the sound collector 110 and collects ambient sound by the sound collector 110. Also, by playing sound data, the user apparatus 100-3 provides sound to the user 10 via the headphones 20. Also, the user apparatus 100-3 has the operating section 150 and, in response to a user input by the user 10 to the operating section 150, performs an operation corresponding to the input.

Especially, in the third embodiment, the user apparatus 100-3 transmits to the server apparatus 200 sound data continuously acquired via the sound collector 110. Also, in response to a user input to play record sound data, the user apparatus 100-3 transmits to the server apparatus 200 report information to report that the user input was made (hereinafter referred to as "playback report information"). Similarly, in response to a user input to stop a playback of record sound data, the user apparatus 100-3 transmits to the server apparatus 200 report information to report that the user input was made (hereinafter referred to as "stop report information").

Similar to the first embodiment, the user apparatus 100-3 is a smartphone, for example. Also, the user apparatus 100-3 may be another user apparatus carried by the user 10.

The server apparatus 200 records sound data received from the user apparatus 100-3. Also, when receiving the playback report information or the stop report information from the user apparatus 100-3, the server apparatus 200 controls a playback of record sound data or stops the playback control in the user apparatus 100-3.

As described above, according to the third embodiment, by the server apparatus 200, the user 10 can check sound one-sidedly provided in an unexpected manner. In [3.2. Configuration of server apparatus] and [3.3. Flow of processing], specific content of the third embodiment will be explained below.

[3.2. Configuration of Server Apparatus]

Figure 11:
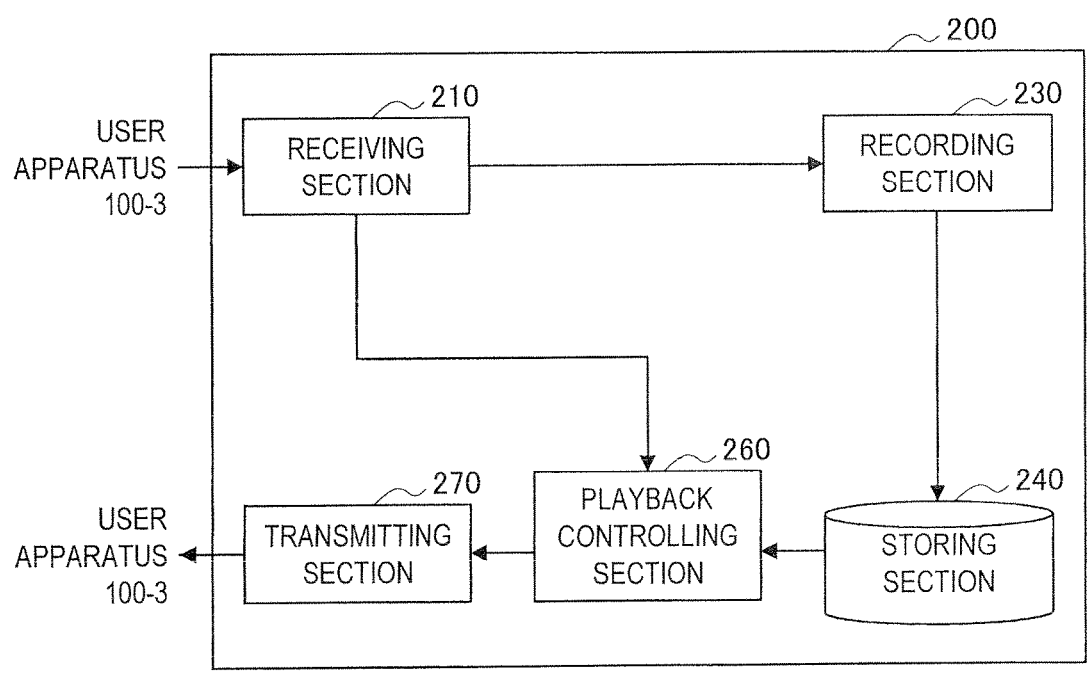
FIG. 11 is a block diagram illustrating an example of a configuration of a server apparatus according to the third embodiment.

With reference to FIG. 11, an example of a configuration of the server apparatus 200 according to the third embodiment will be explained. FIG. 11 is a block diagram illustrating an example of a configuration of the server apparatus 200 according to the third embodiment. Referring to FIG. 11, the server apparatus 200 has a receiving section 210, a recording section 230, a storing section 240, a playback controlling section 260 and a transmitting section 270. Here, the playback controlling section 260 is an example of a controlling section.

Here, the recording section 230 and the storing section 240 are the same as the recording section 130 and the storing section 140 of the first embodiment explained in [1.2. Configuration of user apparatus], except for recording or storing sound data acquired in a plurality of user apparatuses 100-3. Therefore, an explanation will be given below with respect to the receiving section 210, the playback controlling section 260 and the transmitting section 270.

(Receiving Section 210)

The receiving section 210 receives data transmitted to the server apparatus 200. Especially, the receiving section 210 receives, from the user apparatus 100-3, sound data continuously acquired via the sound collector 110 in the user apparatus 100-3. Subsequently, it outputs the sound data to the recording section 230.

Also, the receiving section 210 receives playback report information or stop report information from the user apparatus 100-3. Subsequently, the receiving section 210 outputs the report information to the playback controlling section 260.

(Playback Controlling Section 260)

The playback controlling section 260 controls a playback of record sound data recorded by the recording section 230 in the user apparatus 100-3. Here, in response to a user input in the user apparatus 100-3, the playback controlling section 260 performs control such that the record sound data is played from the timing predated with reference to the timing of the user input. For example, when receiving playback report information from the receiving section 210, the playback controlling section 260 acquires record sound data from the storing section 240 and transmits it to the user apparatus 100-3 via the transmitting section 270. Subsequently, the playback controlling section 260 reports to the user apparatus 100-3 the timing predated with reference to the timing of the user input as the playback start timing.

For example, the timing predated with reference to the timing of the user input is the timing predated by a predetermined time period from the timing of the user input. For example, the playback controlling section 260 performs control such that the record sound data is played from the timing predated by 10 seconds from the timing of the user input.

Also, for example, when receiving stop report information from the receiving section 210, the playback controlling section 260 stops the playback control.

Also, for example, the playback controlling section 260 controls a playback of sound record data, which is acquired in the user apparatus 100-3 and subsequently recorded, in the user apparatus 100-3. That is, the playback controlling section 260 performs control such that record sound data acquired by a user apparatus 100-3a is played in the user apparatus 100-3a and record sound data acquired by a user apparatus 100-3b is played in the user apparatus 100-3b.

(Transmitting Section 270)

The transmitting section 270 transmits data from the server apparatus 200 to another apparatus. Especially, the transmitting section 270 transmits record sound data from the playback controlling section 260 to the user apparatus 100-3.

[3.3. Flow of Processing]

Figure 12:
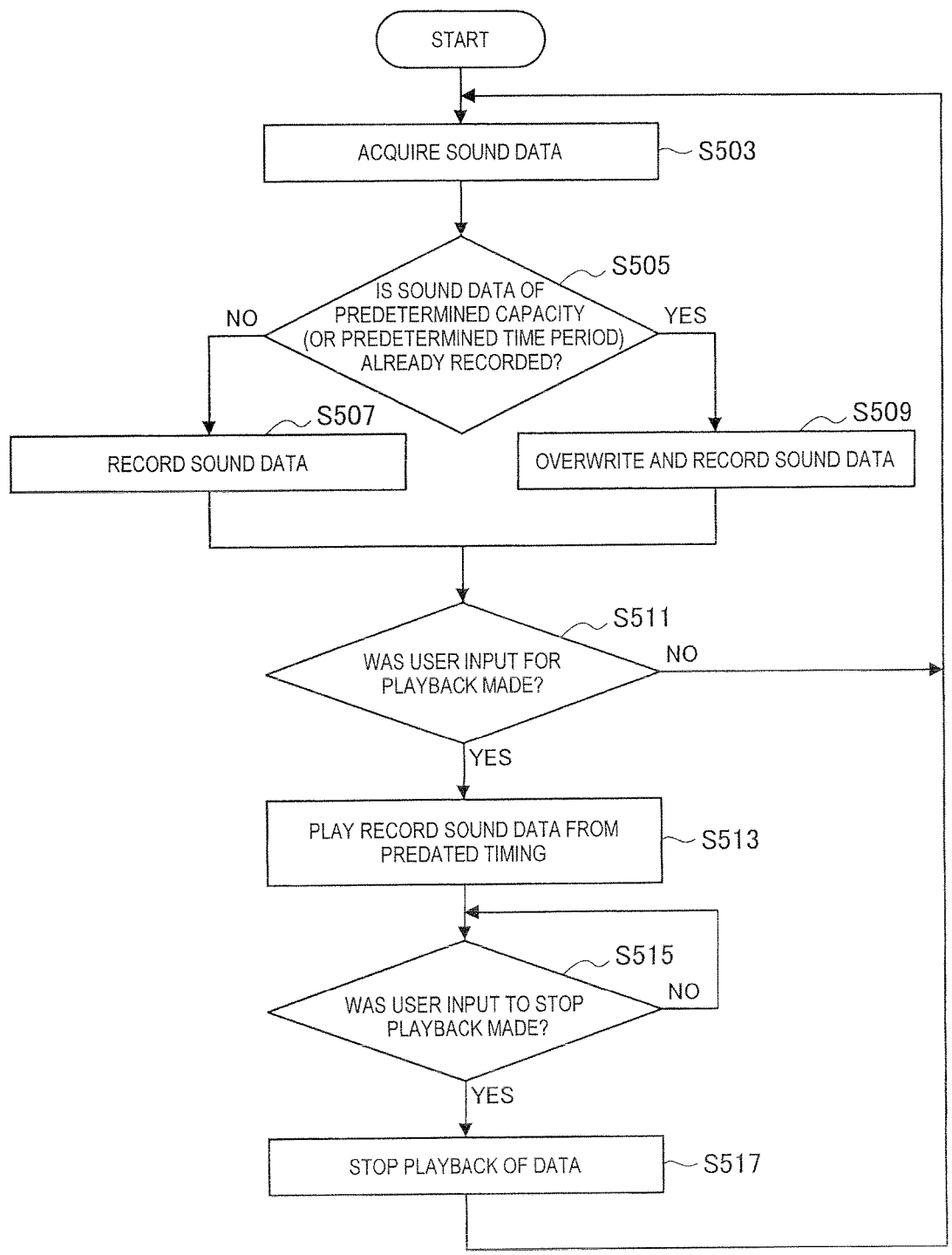
FIG. 12 is a flowchart illustrating an example of a schematic flow of information processing according to the third embodiment.

Next, with reference to FIG. 12, an example of information processing according to the third embodiment will be explained. FIG. 12 is a flowchart illustrating an example of a schematic flow of the information processing according to the third embodiment.

Here, steps S505, S507 and S509 are the same as steps S305, S307 and S309 of the first embodiment in [1.3. Flow of processing], except for recording sound data acquired in the plurality of user apparatuses 100-3. Therefore, an explanation will be given below with respect to steps S503, S511, S513, S515 and S517.

In step S503, the receiving section 210 receives, from the user apparatus 100-3, sound data continuously acquired via the sound collector 110 in the user apparatus 100-3.

In step S511, the playback controlling section 260 determines whether a user input to play record sound data was made. In a case where the user input was made, the processing proceeds to step S513. Otherwise, the processing returns to step S503.

In step S513, the playback controlling section 260 controls a playback of record sound data recorded by the recording section 230 in the user apparatus 100-3. Here, in response to a user input, the playback controlling section 260 performs control such that the record sound data is played from the timing predated with reference to the timing of the user input. That is, in response to the playback control by the playback controlling section 260, the user apparatus 100-3 receives and plays the record sound data.

In step S515, it is determined whether a user input to stop the playback of the record sound data was made. In a case where the user input was made, the processing proceeds to step S517. Otherwise, the processing repeats step S515.

In step S517, when receiving stop report information from the receiving section 210, the playback controlling section 260 stops the playback control.

Although an example of the third embodiment has been described above, the third embodiment is not limited to this. Each variation example explained in [1.4. Variation example] is similarly applicable to the third embodiment. Also, similar to the second embodiment, in the third embodiment, image data may be acquired, recorded and played instead of or together with sound data.

Also, continuously acquired sound data may be acquired by the first user apparatus 100-3*a* and a playback of record sound data may be performed by the second user apparatus 100-3*b*. In this case, the second user apparatus 100-3*b* may be located within a predetermined distance from the first user apparatus 100-3*a*. Thus, by playing sound data acquired in one user apparatus 100-3*a* by another user apparatus 100-3*b*, even the user apparatus 100-3*b* that has not acquired sound data or the user apparatus 100-3*b* that is difficult to acquire sound data can play the sound data from the timing predated with reference to the timing of a user input. Also, when these user apparatuses 100-3 are located in positions close to each other, even the user apparatus 100-3*b* that has not acquired sound data or the user apparatus 100-3*b* that is difficult to acquire sound data can play record sound data in the same way as in a case where the own apparatus acquires the sound data. Here, instead of the user apparatus 100-3*a*, for example, an apparatus set in a predetermined position (e.g. apparatus set in a vehicle or facility) may acquire the sound data.

As described above, according to the third embodiment, the user 10 of the user apparatus 100-3 can check sound one-sidedly provided in an unexpected manner.

4. HARDWARE CONFIGURATION

Next, with reference to FIG. 13, an example of a hardware configuration of the user apparatus 100 according to the present embodiment will be explained. FIG. 13 is a block diagram illustrating an example of the hardware configuration of the user apparatus 100 according to the present embodiment. Referring to FIG. 13, the user apparatus 100 has a CPU 601, a ROM 603, a RAM 605, a bus 607, a storing apparatus 609, a communication apparatus 611, an input/output interface 613, a displaying apparatus 615 and a microphone 617.

The CPU functions as a computation processing apparatus and control apparatus, and controls all or part of operations in the user apparatus 100 according to various programs recorded in the ROM 603, the RAM 605 or the storing apparatus 609. Also, the ROM 603 stores a program or computation parameter used by the CPU 601. Also, the RAM 605 is used as a work memory to develop a program at the time of program execution in the CPU 601 or as a buffer memory to temporarily store data.

The bus 607 mutually connects the CPU 601, the ROM 603 and the RAM 605. Further, the storing apparatus 609, the communication apparatus 611, the input/output interface 613, the displaying apparatus 615 and the microphone 617 are connected to the bus 607.

The storing apparatus 609 stores, for example, basic software such as an OS, and various kinds of data such as an application. Here, as a storage medium, for example, there are a magnetic storage medium such as a hard disk, an EEPROM (Electrically Erasable and Programmable Read. Only Memory) and a nonvolatile memory such as a flash memory, but it is not limited to these.

The communication apparatus 611 is a communication unit held by the user apparatus 100 and performs wireless/wired communication with an external apparatus via a network (or directly). Here, as the communication apparatus 611, for example, there are a communication antenna and an RF circuit (wireless communication), an IEEE 802.15.1 port and a transmission/reception circuit (wireless communication), an IEEE 802.11b port and a transmission/reception circuit (wireless communication) or an LAN terminal and a transmission/reception circuit (wired communication), but it is not limited to these.

The input/output interface 613 connects, for example, the headphones 20 and the imaging apparatus 30. Here, as the input/output interface 613, for example, there are an USB (Universal Serial Bus) terminal and an HDMI (High-Definition Multimedia Interface) terminal, it is not limited to these.

The displaying apparatus 615 displays an image. As the displaying apparatus 615, for example, there are an LCD and an organic Electro Luminance display, but it is not limited to these.

The microphone 617 collects ambient sound of the user apparatus 100.

Although the hardware configuration of the user apparatus 100 has been described above, the hardware configuration is applicable as the configuration of the server apparatus 200.

5. CONCLUSION

The user apparatus 100 and the server apparatus 200 according to the embodiments of the present disclosure have been described above using FIG. 1 to FIG. 13. According to the present embodiment, by acquiring, recording and playing continuous data via a sensor, it is possible to check information such as sound and image one-sidedly provided in an unexpected manner.

Also, for example, record data is played from the timing predated by a predetermined time period from the timing of a user input. Therefore, if it is possible to determine a predetermined time period suitable to a time period taken to make a user input after information such as sound and image is provided and it is found that it is failed to be heard or watched, the user 10 can hear the information such as sound and image from the timing predated by the sufficient time period.

Alternatively, for example, record data includes a plurality of chapters divided on the time axis and the record data is played from the start timing of one of the multiple chapters. For example, when chapters are divided at predetermined time intervals, it is possible to rehear sound from the time adequately predated from the timing of a user input, without complicated processing. Alternatively, for example, if chapters are divided based on data content, it is possible to rehear sound from the timing predated to immediately before the most-recently provided sound.

Also, for example, record data is played from the timing determined based on data content. Therefore, it is possible to perform a playback from the timing before desired information is provided, and thereby rehear the desired information.

It should be understood by those skilled in the art that various modifications, combinations, sub-combinations and alterations may occur depending on design requirements and other factors insofar as they are within the scope of the appended claims or the equivalents thereof.

For example, each step in the information processing in the present specification may not be processed in chronological order along the order described in the flowcharts. For example, each step in the information processing may be processed in different order from the order described in the flowcharts or processed in parallel.

Also, regarding hardware such as a CPU. ROM and RAM included in a user apparatus or server apparatus, it is possible to create a computer program to achieve the same function as that of each configuration of the user apparatus or server apparatus. Also, a storage medium storing the computer program is provided.

Additionally, the present technology may also be configured as below.

(1) An information processing apparatus including:
a recording section recording data continuously acquired via a sensor; and
a controlling section controlling a playback of record data recorded by the recording section,
wherein, in response to a user input, the controlling section performs control such that the record data is played from a timing predated with reference to a timing of the user input.

(2) The information processing apparatus according to (1), wherein the predated timing is a timing predated by a predetermined time period from the timing of the user input.

(3) The information processing apparatus according to (1), wherein the record data includes a plurality of parts divided on a time axis; and
wherein the predated timing is a start timing of any one of the plurality of parts.

(4) The information processing apparatus according to (3), wherein the predated timing is a start timing of a part closest to the timing of the user input among the plurality of parts.

(5) The information processing apparatus according to (3) or (4), wherein the record data includes a plurality of parts divided at predetermined time intervals.

(6) The information processing apparatus according to (3) or (4), wherein the record data includes a plurality of parts divided based on data content.

(7) The information processing apparatus according to (6), wherein the sensor includes a sound collector;
wherein the data continuously acquired includes sound data; and
wherein the record data includes a plurality of parts divided based on a loudness or frequency of sound included in the sound data.

(8) The information processing apparatus according to (1), wherein the predated timing is a timing determined based on data content.

(9) The information processing apparatus according to (8), wherein the sensor includes a sound collector;
the data continuously acquired includes sound data; and
the predated timing is a timing determined based on a detection result of keyword sound in the sound data.

(10) The information processing apparatus according to any one of (1) to (9), wherein, in response to a type of the user input, the controlling section determines a timing predated with reference to the timing of the user input and performs control such that the record data is played from the determined timing.

(11) The information processing apparatus according to any one of (1) to (10),
wherein the recording section records the data continuously acquired, even during a playback of the record data; and
wherein the controlling section performs control such that the record data is played between a timing predated with reference to the timing of the user input and one of timings after the user input.

(12) The information processing apparatus according to any one of (1) to (11), wherein the recording section records part of the data continuously acquired.

(13) The information processing apparatus according to any one of (1) to (12),
wherein the data continuously acquired is acquired by a first apparatus; and
the playback of the record data is performed by a second apparatus.

(14) The information processing apparatus according to (13), wherein the second apparatus is located within a predetermined distance from the first apparatus.

(15) The information processing apparatus according to any one of (1) to (14),
wherein the sensor includes at least one of a sound collector and an image pickup device; and
wherein the data continuously acquired includes sound data when the sensor includes the sound collector, and includes image data when the sensor includes the image pickup device.

(16) A program that causes a computer to function as:
a recording section recording data continuously acquired via a sensor; and
a controlling section controlling a playback of record data recorded by the recording section,
wherein, in response to a user input, the controlling section performs control such that the record data is played from a timing predated with reference to a timing of the user input.

(17) An information processing method including:
recording data continuously acquired via a sensor; and
controlling a playback of record data recorded,
wherein, in response to a user input, the controlling includes controlling to play the record data from a timing predated with reference to a timing of the user input.

The present disclosure contains subject matter related to that disclosed in Japanese Priority Patent Application JP 2011-261519 filed in the Japan Patent Office on Nov. 30, 2011, the entire content of which is hereby incorporated by reference.

What is claimed is:
1. An information processing apparatus comprising:
one or more processors configured to:
record data continuously acquired through a sensor in a buffer memory;
divide the recorded data into a plurality of parts on a time axis based on a sound frequency of the recorded data; and
control a playback of the recorded data, based on a first time that corresponds to a user input to play the recorded data, from a second time that is prior to the first time by a time period on the time axis, wherein the recorded data is played back from a start time of a part closest to the first time among the plurality of parts.

2. The information processing apparatus according to claim 1, wherein the second time is the start time of one of the plurality of parts.

3. The information processing apparatus according to claim 1, wherein the one or more processors are further configured to divide the recorded data into the plurality of parts based on a time interval.

4. The information processing apparatus according to claim 1, wherein the one or more processors are further configured to divide the recorded data into the plurality of parts based on an amplitude of sound included in the recorded data.

5. The information processing apparatus according to claim 1, wherein the second time is based on data content.

6. The information processing apparatus according to claim 5, wherein the data continuously acquired includes sound data, wherein the second time is based on a detection result of a keyword sound in the sound data.

7. The information processing apparatus according to claim 1, wherein, based on a type of the user input, the one or more processors are further configured to determine a third time prior to the first time and control the playback of the recorded data from the third time.

8. The information processing apparatus according to claim 1,
wherein the one or more processors are configured to:
record the data continuously acquired during the playback of the recorded data; and
control the playback of the recorded data between the second time and a third time that is after the first time on the time axis.

9. The information processing apparatus according to claim 1, wherein the one or more processors are further configured to record a part of the data continuously acquired by the sensor.

10. The information processing apparatus according to claim 1, wherein the data continuously acquired is acquired by a first apparatus; and the playback of the recorded data is executed by a second apparatus.

11. The information processing apparatus according to claim 10, wherein the second apparatus is located within a distance from the first apparatus.

12. The information processing apparatus according to claim 1,
wherein the sensor includes an image pickup device; and
wherein the data continuously acquired includes image data.

13. The information processing apparatus according to claim 1, wherein the one or more processors are further configured to:
determine a playback start time that is prior to the first time on the time axis; and
control the playback of the recorded data based on the determined playback start time.

14. The information processing apparatus according to claim 1, wherein the record data is divided into a plurality of chapters based on one of data division or information indicating time periods for division of the plurality of chapters.

15. A non-transitory computer-readable medium having stored thereon computer-executable instructions which when executed by a computer, cause the computer to execute operations, the operations comprising:
recording data continuously acquired through a sensor in a buffer memory;
dividing the recorded data into a plurality of parts on a time axis based on a sound frequency of the recorded data; and
controlling a playback the recorded data based on a first time that corresponds to a user input to play the recorded data from a second time that is prior to the first time by a time period on the time axis,
wherein the recorded data is played back from a start timing of a part closest to the first time among the plurality of parts.

16. An information processing method, comprising:
recording data continuously acquired through a sensor in a buffer memory;
dividing the recorded data into a plurality of parts on a time axis based on a sound frequency of the recorded data; and
controlling a playback of the recorded data based on a first time that corresponds to a user input to play the recorded data from a second time that is prior to the first time by a time period on the time axis,
wherein the recorded data is played back from a start timing of a part closest to the first time among the plurality of parts.

* * * * *